(No Model.)

E. G. BOYNTON & A. G. BROWN.
DRAFT EQUALIZER.

No. 431,547. Patented July 8, 1890.

Witnesses

Inventors
Ervin G. Boynton
Alfred G. Brown
By Gibson & Benjamin
Their Attorneys

UNITED STATES PATENT OFFICE.

ERVIN G. BOYNTON AND ALFRED G. BROWN, OF LA CROSSE, WISCONSIN.

DRAFT-EQUALIZER.

SPECIFICATION forming part of Letters Patent No. 431,547, dated July 8, 1890.

Application filed December 24, 1889. Serial No. 335,171. (No model.)

*To all whom it may concern:*

Be it known that we, ERVIN G. BOYNTON and ALFRED G. BROWN, citizens of the United States, residing at La Crosse, in the county of La Crosse and State of Wisconsin, have invented certain new and useful Improvements in Draft-Equalizers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to draft-equalizers. Its object is to equalize the draft when the power is unequally applied to the opposite sides of the center of draft, and to overcome the side or diagonal draft incident to such unequal application of power.

Its further purpose is to steady the pole of a vehicle, so as to prevent it from jerking from side to side in passing over uneven ground.

Our device is known as "the farmer's perfect three-horse hitch."

Figure 1:
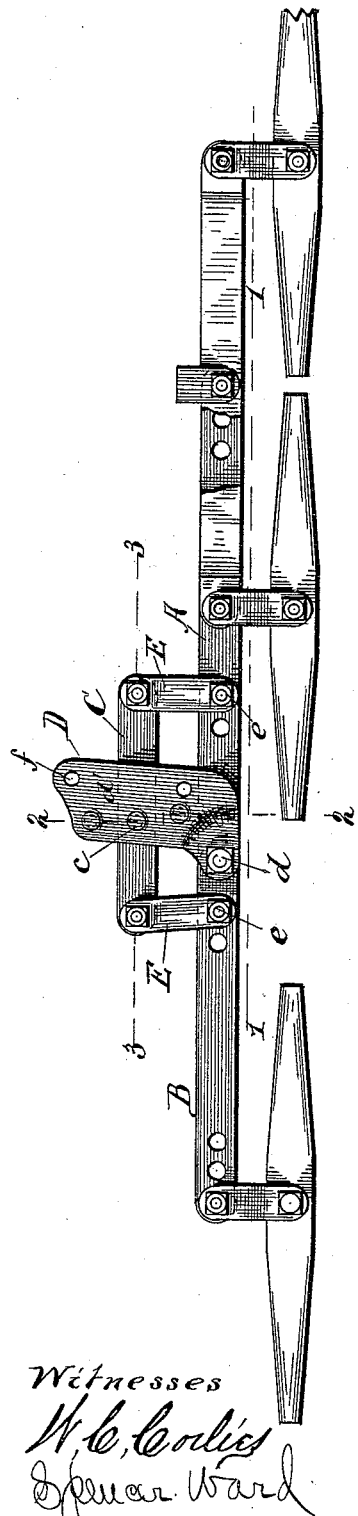
Figure 2:
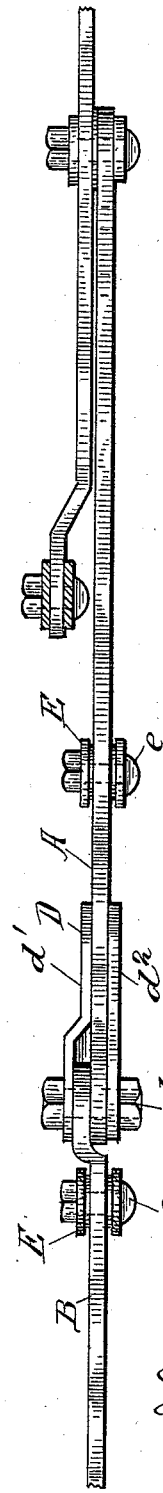
Figure 4:
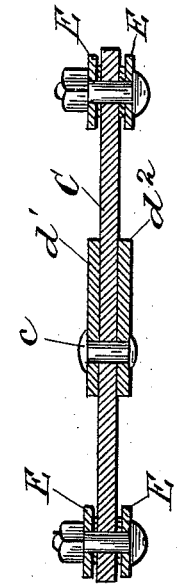
Figure 3:
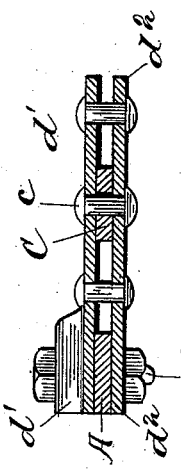

Figure 1 in the accompanying drawings shows a plan view of our device. Fig. 2 is a front elevation, partly in section, through the line 1 1, Fig. 1. Fig. 3 is a sectional view through the line 2 2 in Fig. 1; and Fig. 4 is a sectional view through the line 3 3, Fig. 1.

Our present invention is an improvement upon a similar device for which Letters Patent numbered 395,874 were granted Alfred G. Brown January 8, 1889.

In use it has been found that the separate attachments of the draft-levers and of the compensating lever to the wear-plate or plow-beam militates against the success of the equalizer, and we have now sought to overcome the difficulties so occasioned by pivoting the compensating lever as nearly as possible directly behind the pivotal point of the draft-levers, and placing between these two pivotal points a rigid member, so that the back pressure from the draft-levers and the forward pressure of the compensating levers react the one upon the other. The side draft, caused by the unequal distribution of the power, is overcome or balanced by securing a corresponding side draft in the opposite direction by locating the draft-point—that is, the pivotal point of the compensating lever— a suitable distance from the central line of draft on the side thereof opposite that upon which the excess of power is applied.

For the purpose of securing simplicity and rigidity, we form the draw-bar, by means of which the equalizer is secured to the plow, of two broad plates, one above the other, between which the levers are pivoted and which are securely riveted together.

More particularly described, our invention consists of the draft-levers A and B, of unequal length, of the draw-bar D, consisting of the plates $d'$ $d^2$, securely united, the levers A B being pivotally attached to the plate D at the same point $d$, of the compensating lever C, pivoted to the plate D at $c$, and the straps E E, uniting the ends of the lever C with the levers A B at suitable distances from their pivotal point $d$, as $e$ $e$.

The relative proportions of the several levers must necessarily be governed by the relative size of the horses used. For three horses of substantially uniform strength we find it advisable to proportion the parts approximately as shown, the short or one-horse lever B being unduly powerful, and this undue advantage being compensated for by so pivoting the lever C that its two arms are of unequal length, the shorter end being secured to the lever B.

The device is attached to the plow by means of the eye $f$, which is placed out of the line of the pivotal attachments of the levers and on the same side of the plate as the long draft-lever, for the purpose of securing the balance of side draft, as hereinbefore set forth.

By the arrangement of parts described the reaction of the back-pressure of the draft-levers upon the forward draft of the compensating lever is sustained by that portion of the plate D lying between the points $d$ and $c$, and the connection between the three pivotal points $d$ $c$ $f$ is rigid.

We claim—

In a draft-equalizer, the combination of swinging draft-levers and a rocking compensating lever having its ends connected to the draft-levers by pull-straps, the several levers being pivotally attached to a rigid draw-bar adapted to be attached to the load on a line between the central draft-point and the point at which the excess of power is applied, substantially as described, and for the purpose set forth.

In testimony whereof we affix our signatures in presence of witnesses.

ERVIN G. BOYNTON.
ALFRED G. BROWN.

Witnesses:
A. STEINLEIN,
M. L. BARLOW,
GEORGE M. SMITH,
OLE P. FLUTON.